March 17, 1970     V. J. FLINK     3,501,030
CAM OPERATING MECHANISM FOR UNLOADING BOX
Filed June 7, 1968     3 Sheets—Sheet 1
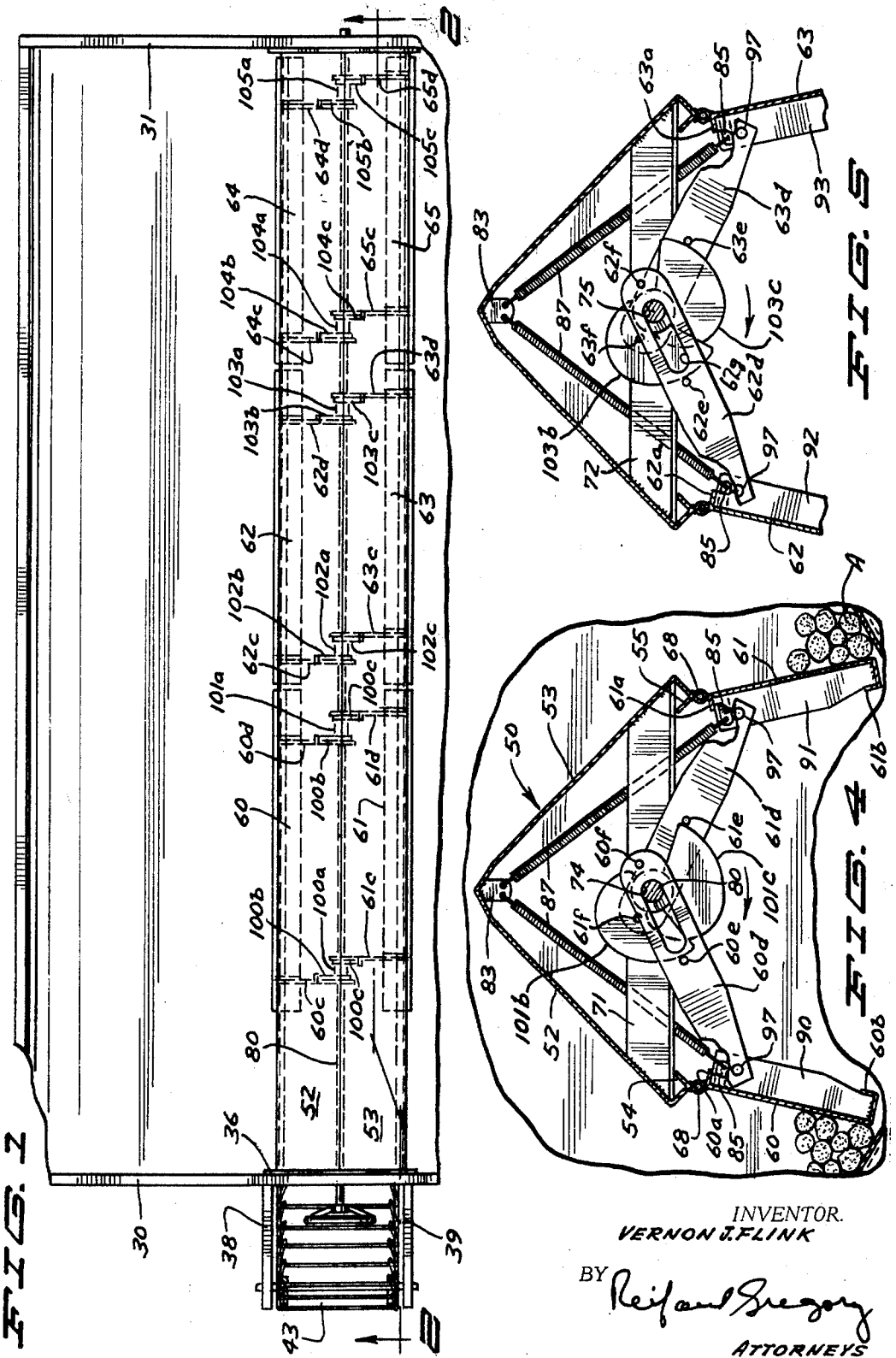
INVENTOR.
VERNON J. FLINK
BY
ATTORNEYS March 17, 1970 V. J. FLINK 3,501,030
CAM OPERATING MECHANISM FOR UNLOADING BOX
Filed June 7, 1968 3 Sheets-Sheet 2
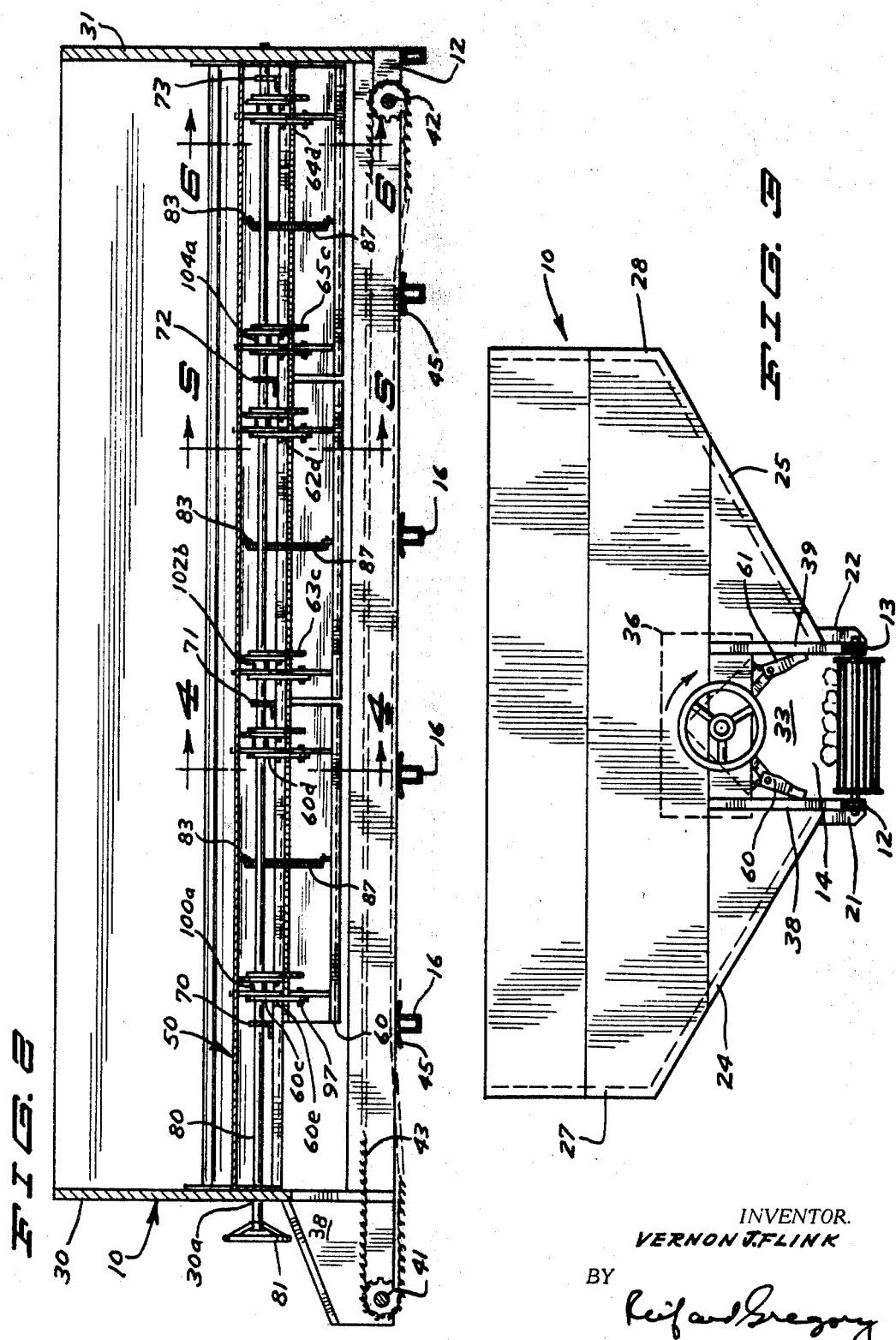
INVENTOR.
VERNON J. FLINK
BY
Richard Gregory
ATTORNEY

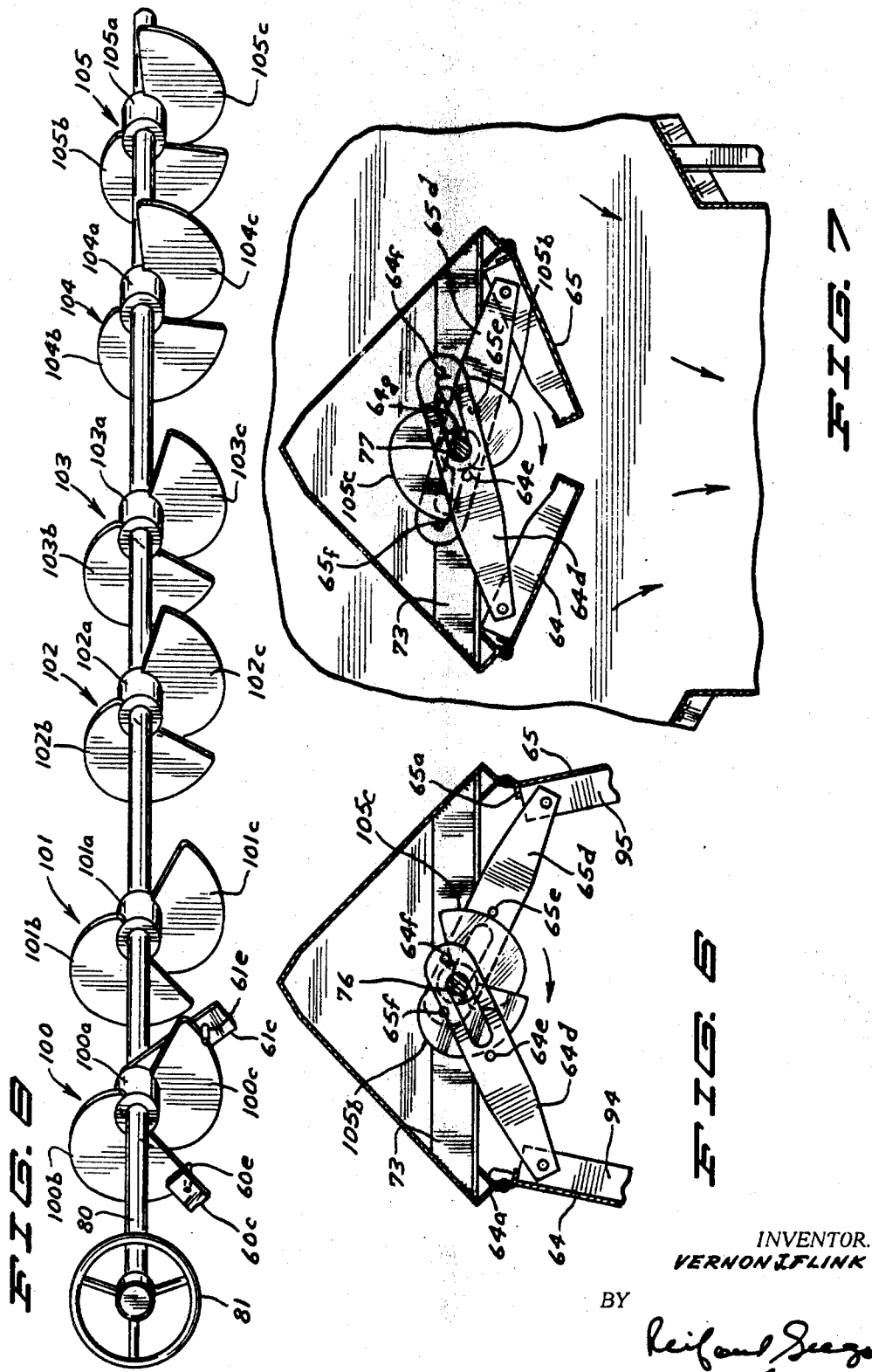

United States Patent Office

3,501,030
Patented Mar. 17, 1970

3,501,030
CAM OPERATING MECHANISM FOR UNLOADING BOX
Vernon J. Flink, Cambridge, Minn., assignor to Braco, Inc., Braham, Minn., a corporation of Minnesota
Filed June 7, 1968, Ser. No. 735,264
Int. Cl. B65g 65/42; B61d 7/26; B60p 1/56
U.S. Cl. 214—17  9 Claims

ABSTRACT OF THE DISCLOSURE

A bulk loading box having an end discharge outlet and a bottom disposed endless discharge conveyor, an elevated cover overlying said conveyor, a plurality of opposed pairs of gates hinged to depend at either side of said cover, linkage in connection with opposed pairs of said gates, an operating rod for said linkage, cam members carried by said rod actuating said linkage to operate said pairs of gates in sequential order and spring members returning said gates to an initial position when released by said cam members.

BACKGROUND AND SUMMARY OF THE INVENTION

The invention herein relates to unloading apparatus in connection with a bulk box such as is used customarily for loading root crops from a harvester such as in harvesting potatoes. It is common for such a box to embody an endless belt or a screw type conveyor for unloading purposes with the box being unloaded as a whole or as a single compartment causing a tumbling of the crop within the box and a jamming at the discharge outlet resulting in crop damage.

With reference to known art, U.S. Letters Patent No. 2,686,693 to Korpela shows the use of an elevated hinged door extending the full length of a box and being adapted to be pivoted on a central longitudinal axis to open into the bottom of the box. A like showing is made in U.S. Letters Patent No. 3,148,837 to Doolin. In U.S. Letters Patent No. 2,466,923 to Woodward, there is a central longitudinal hatch or cover which is elevated for unloading purposes.

The structure comprising the subject matter of the invention herein is clearly distinguishable from the reference material indicated. The structure herein provides for unloading the crop within the box in stages as if the box were in compartments wherein sequential portions of said crop are unloaded leaving the remainder of the box for the most part relatively undisturbed. The structure herein provides for opposed pairs of gates to uncover the unloading conveyor to permit the crop to move onto the conveyor, said gates having cam connected linkage in connection with an operating rod whereby the gates by means of a single rod are operated to uncover the unloading conveyor in sequential order. Thus orderly and efficient unloading results without the accumulation or jamming of the crop at the discharge outlet.

It is an object of this invention therefore to provide sequentially operated unloading apparatus for a bulk loading box.

It is another object of this invention to provide a bulk unloading box comprising a plurality of gates overlying the discharge conveyor of said box, said gates having cam controlled linkage for connection with a single operating member adapted with respect to said cams to move said gates in sequential order for uncovering said conveyor for movement of the crop in said box onto said conveyor.

More specifically it is an object of this invention in connection with a bulk unloading box having a central discharge conveyor to provide a cover for said conveyor having opposed pairs of gates hinged at either side thereof, linkage in connection with respective pairs of said gates, an operating rod in connection with said linkage, cam members carried by said operating rod being arranged thereon to actuate said linkage for sequential operation of said gates.

These and other objects and advantages of the invention will be set forth in the following description made in connection with the accompanying drawings in which like reference characters refer to similar parts throughout the several views and in which:

FIG. 1 is a top plan view with portions being shown in dotted lines and some portions thereof being broken away;

FIG. 2 is a view in vertical longitudinal section taken on line 2—2 of FIG. 1;

FIG. 3 is a view in end elevation;

FIGS. 4–6 are views in vertical cross section on an enlarged scale taken on lines 4—4, 5—5 and 6—6 respectively of FIG. 2 as indicated;

FIG. 7 is a broken view in vertical cross section similar to FIG. 6 showing portions thereof in different position; and FIG. 8 is a perspective view on an enlarged scale of an operating mechanism showing a sequential relation between the respective portions thereof and including broken portions of related detail.

DESCRIPTION OF A PREFERRED EMBODIMENT

With reference to the drawings, a bulk loading box of basic conventional metal sheet construction is indicated generally by the reference numeral 10. Preferably said box is of unitary welded construction comprising a pair of laterally spaced centrally disposed channel frame members 12 and 13 forming a bottom opening 14 therebetween and having underlying longitudinally spaced transverse channel members 16. A mobile undercarriage support for said box is not shown and is not necessary with respect to the disclosure of the invention herein.

Integral with the outer sides of said frame members 12 and 13 are upstanding wall members 21 and 22 of short height defining the central longitudinal portion of said box 10 and respectively inclined upwardly outwardly therefrom are wall members 24 and 25 which terminate in upwardly extending vertical side wall portions 27 and 28. Enclosing the ends of said box 10 are unitary front and rear walls 30 and 31.

Said front end wall has a central bottom opening 33 therein forming a discharge outlet and reinforcing the inner side thereof is a frame member 36.

Extending forwardly of said end wall 30 are the frame members 12 and 13 and upstanding from said extended portions are side wall portions 38 and 39 and said side wall portions will have their inner ends welded to said end wall 30.

Journaled between said frame members 12 and 13 adjacent either end thereof are sprocket equipped shafts 41 and 42 having an endless conveyor 43 passing over the sprockets thereof. Said conveyor preferably may be a link type belt such as used in connection with potato harvesters. Said belt will be positioned to have its lower run pass over idler support members 45 carried on said cross members 16. The upper run of said conveyor may have idler supports although none are shown. Driving means will be applied in a conventional manner to one of said shafts to drive said conveyor.

The subject matter comprising the improvement in said box will now be set forth.

Extending the full length of the interior of said box and elevated above said conveyor 43 is an inverted U-shaped hatch or cover 50 supported between and secured as by welding to said end walls 30 and 31. Said cover comprises inclined walls 52 and 53 which respectively have side edge portions 54 and 55 angled inwardly to form channels, as indicated in FIG. 4.

Hinged at either side of said cover to said edge portions 54 and 55 are a plurality of transverse or opposed pairs of longitudinally aligned substantially flat rectangular gate members or gates 60–61, 62–63 and 64–65 forming closure means. Said gate members in extended position bridge the space between said cover 50 and the side walls 24 and 25, as indicated in FIG. 4.

Said gates have angled upper side edge portions 60a–61a, 62a–63a and 64a–65a, and particularly for stiffness are shown having inwardly angled lower edge portions as shown in FIG. 4 by 60b–61b for the gates 60–61.

Said gates at either side of said cover will be hinged as by suitable piano type hinges 68, as indicated in FIGS. 1–7. The gates 60–61 will be spaced from said end wall for a short distance, as indicated in FIG. 1, to provide room for unloading or discharge purposes.

Extending across and bridging the lower side edge portions of said cover 50 and spaced therealong are a plurality of angled plate members 70–73. Said plate members have aligned apertures therethrough, as indicated at 74–77, and also in alignment therewith is aperture 30a in the end wall 30.

A rod 80 extends through said apertures 30a and 74–77 and will extend outwardly of said end wall 30 carrying as operating means a hand wheel 81 at the extended end thereof for rotative operation thereof.

Depending from the apex of said cover 50 are plate-like apertured keepers 83 spaced inwardly longitudinally of the respective ends of said pairs of gates. Corresponding aligned studs or keepers 85 project inwardly at right angles from the side walls of said gates, and though shown in FIGS. 4–6 as being at the upper portions of said gates, said keepers may be positioned further down on the gates for more effective leverage. Strong tension coil springs 87 will connect the respective keepers 85 and 83 as illustrated.

Adjacent the respective ends of each of said gates and extending inwardly of the side walls thereof at right angles thereto are flanges comprising plate or rib members. Thus each gate has a longitudinally spaced pair of said rib members and opposed pairs of said gates each have opposed pairs of said rib member. With reference to FIGS. 4–6, only one opposed pair of said ribs is shown for each opposed pair of gates. Hence opposed rib members 90–91 are shown with respect to gates 60–61, opposed rib members 92–93 are shown with respect to gates 62–63 and opposed rib members 94–95 are shown with respect to gates 64–65. Said opposed pairs of rib members will not be in exact cross alignment but will be in a somewhat staggered or offset relationship, as will be further described.

Connecting said gates by means of said flanges and said rod are linkage means as hereinafter described. Pivoted at one end to each of said flanges is an elongated plate link having an elongated slot longitudinally thereof adjacent the free end thereof, and said rod 80 will extend through the slots of said links.

Said gates 60–61 will have opposed pairs of links 60c–61c and 60d–61d, gates 62–63 will have opposed pairs of links 62c–63c and 62d–63d, and gates 64–65 will have opposed pairs of links 64c–65c and 64d–65d. The slots will bear the reference numerals of their respective links with the letter g added, as shown in FIGS. 5 and 6.

Said links will each be pivoted to said rib members by rivets 97, as indicated in FIGS. 4–7.

Carried by each of said links is a pair of cam follower pins positioned adjacent either end of the slots in said links. Said pins are clearly shown in FIGS. 4–7 with respect to the links shown therein. The pins of each link are respectively designated by the characters e and f preceded by the reference numeral of its link, i.e., link 60c has pins 60e and 60f. Said pins will project from the facing sides of opposed pairs of links.

Carried on said rod 80 are spaced cam assemblies 100–105 of which cam assemblies 100 and 101 form one pair of identical arrangement, cam assemblies 102 and 103 form another identical pair and cam assemblies 104 and 105 form a third identical pair of cam assemblies.

Each cam assembly comprises a hub carrying a pair of cam members spaced axially thereof and radially thereabout. Said cam assemblies are respectively disposed between the link members forming opposed pairs of links.

The cam assembly 100 comprises a hub 100a and radially disposed cam members 100b and 100c. The hub is bored to be positioned onto and secured to said shaft 80. In like manner the cam assembly 101 comprises a hub 101a and cam members 101b and 101c. The cam assembly 102 comprises a hub 102a and cam members 102b and 102c. The cam asembly 103 comprises a hub 103a and cam members 103b and 103c. The cam assembly 104 comprises a hub 104a and cam members 104b and 104c, and cam assembly 105 comprises a hub 105a and cam members 105b and 105c.

The respective pairs of said cam assemblies are advanced radially in sequence to the right about said rod 80 as viewed in FIG. 8. This will be further described.

With respect to cam asembly 100, the hub 100a is disposed on the rod 80 to be between the links 60c and 61c.

The goods in said box 10 are indicated by the character A.

OPERATION

To commence the loading of box 10, the gate members will be held in extended or closed position by the cam members being position as indicated in FIGS. 4–6. Said cam members respectively will be engaging their respective cam follower pins bearing the suffix letter e.

To retract the gate members for unloading said box, the rod 80 will be rotated by the handwheel 81 from right to left as faced by the operator. As the cam members are rotated about the rod 80 to retract, or open the gate members, the cam members 100b–101b and 100c–101c will become disengaged from the cam follower pins bearing the suffix letter e and will engage the cam follower pins bearing the suffix letter f and thus the links are moved longitudinally to the extent of their respective slots with respect to the rod 80. In the meanwhile, the endless conveyor 43 is in operation and the potatoes within the box between the gate members 60 and 61 and the end wall 30 will be first discharged. With the retraction of the gate members 60 and 61, the potatoes overlying said gate members are next discharged. The cam members are so positioned radially about the rod 80 that upon the completion of the retraction of the gates 60 and 61, the gates 62 and 63 will be retracted in like manner as said first mentioned gates. Upon the retraction of gates 62 and 63, the gate members 64 and 65 will be retracted. All of this is accomplished with a constant rotation of the rod 80 and the potatoes will be discharged so that the load overlying each pair of respective gates will be practically totally discharged by the time the succeeding pair of gates is being retracted. Gates in retracted position are illustrated in FIG. 7 with respect to the cam members 105b and 105c and the link members 64d and 65d. In the interval that the cam members are fully disengaged from the cam follower pins bearing the suffix f, the spring members 87 will hold the gate members in fully retracted position. At this point, the rotation of the rod 80 will be stopped until all potatoes have been discharged from the box.

The cams are so arranged and diverged radially that the first set of gates retracted will be fully retracted before the second set of gates commences to be retracted. In like manner the third set of gates is retracted and the first set of gates is still retained in retracted position. When the box has been emptied, the rotation of rod 80 will be continued for engagement of the cam members from the cam follower pins bearing the suffix $f$ to the cam follower pins bearing the suffix $e$ whereby the gates will be returned to extended or closed position. It is seen that upon a full rotation of the rod 80 that the link members are moved through reciprocal paths and that the link members reciprocate to the extent of the lengths of their respective slots.

Closure means for the opening 33 may be provided, but such means are not shown in the present embodiment.

Thus it is seen that there has been provided a simple and efficiently arranged cam operating means for an unloading operation of a bulk loading box.

It will of course be understood that various changes may be made in the form, details, arrangement and proportions of the parts, without departing from the scope of the invention herein which, generally stated, consists in an apparatus capable of carrying out the objects above set forth, in the parts and combinations of parts disclosed and defined in the appended claims.

What is claimed is:

1. An unloading apparatus in connection with a bulk unloading box having end walls, inclined side wall portions and a central longitudinally disposed underlying endless conveyor, having in combination, an elevated cover overlying said conveyor,
closure means carried at opposite sides of said cover and being adapted to prevent the passage of goods between said cover and said side wall portions,
a rod disposed longitudinally of said cover, means carried by said cover rotatively supporting said rod,
linkage means respectively connecting said closure means and said rod,
a cam assembly secured to said rod comprising cam members engaging said linkage, and
operating means for said rod moving said cam members and operating said closure means.

2. The structure set forth in claim 1, wherein
said closure means comprises a plurality of opposed pairs of gate members in longitudinal alignment hinged at opposite sides of said cover.

3. The structure set forth in claim 1, wherein
said closure means comprises a plurality of opposed pairs of gate members in longitudinal alignment hinged at opposite sides of said cover,
said linkage means comprises a pair of opposed link members disposed adjacent either end of said respective gate members, and
said cam assembly comprises a pair of radially diverging cam members for each opposed pair of said link members engaging said link members to operate said gate members.

4. The structure set forth in claim 3, wherein
said opposed pairs of said link members have remote ends pivoted to said gate members and have elongated slots in their adjacent end portions and have said rod pass therethrough,
said link members have cam follower pins engaged by said cam members for reciprocal movement of said link members in operating said gate members.

5. An unloading apparatus in connection with a bulk unloading box having end walls, inclined side wall portions and a central longitudinally disposed underlying endless conveyor, having in combination, an elevated cover overlying said opening,
a pair of gate members in opposed relation hinged to opposite sides of said cover to prevent passage of goods between said cover and said side wall portions,
a rod disposed longitudinally of said cover, means carried by said cover rotatively supporting said rod,
linkage means respectively connecting said gate members and said rod,
a cam assembly carried by said rod comprising a pair of cam members engaging said linkage, and
operating means for said rod rotating the same to move said cam members and actuate said links to operate said gate members.

6. The structure set forth in claim 5, wherein
said linkage means comprises a pair of opposed link members having their remote end portions respectively pivoted to said gate members and having said rod disposed through their adjacent end portions, and
said cam assembly is disposed between said link members, and comprises a pair of radially diverging cam members respectively engaging said link members.

7. The structure set forth in claim 6, wherein
said link members have projecting cam follower pins engaged by said cam members.

8. The structure set forth in claim 6, wherein
said link members have elongated slots at their adjacent ends through which said rod is disposed,
cam follower pins project from said respective link members at either end of the slots therein, and
said cam members respectively engage said link members and move the same through a reciprocal path to extend and retract said gate members.

9. The structure set forth in claim 8, wherein
spring members connect said gate members with said cover to hold said gate members in retracted position.

References Cited

UNITED STATES PATENTS

| 2,776,078 | 1/1957 | Raynor | 222—502 XR |
| 3,356,270 | 12/1967 | Heider | 214—83.2 XR |

ROBERT G. SHERIDAN, Primary Examiner

U.S. Cl. X.R.

105—287, 296; 214—83.2; 222—503